3,332,785
PROCESS FOR THE PREPARATION OF PRE-
GELATINIZED, COLD-SETTING STARCH
Eduard Kuchinke and Karl Buchta, Ingelheim (Rhine),
Germany, assignors to Boehringer Ingelheim G.m.b.H.,
Ingelheim (Rhine), Germany, a corporation of Germany
No Drawing. Filed Aug. 2, 1963, Ser. No. 299,491
Claims priority, application Germany, Aug. 14, 1962,
B 68,436
5 Claims. (Cl. 99—139)

This invention relates to a process for the preparation of a cold-setting starch.

More particularly, the present invention relates to a novel method of preparing a cold-setting, pre-gelatinized starch adapted for use in the preparation of shape-retaining puddings, sliceable custards and similar food products.

It is known that it is possible to obtain a cold-swellable starch, that is, a starch which will set by merely stirring it into cold water or milk and allowing the mixture to stand, by subjecting commercial starch to various preliminary treatments, such as hydrolysis with alkalies or mineral acids, gelatinization with or without additives such as inorganic salts, and subsequent transformation of the treated starch into a dry product. By adding thickening and water-binding agents, such as alginates, gelatins or phosphates, the shape-retention and slicing properties of the cold-set product may be improved, but the corresponding properties of an analogous product made from boiled starch can not be achieved. Moreover, many of the materials which are added to the pre-gelatinized starch for the purpose of improving the shape-retention and slicing properties of the ultimate food products made therefrom adversely affect their organoleptic properties. For instance, the addition of alginates produces an unpleasant sandy sensation in the mouth. Similiarly, the taste of the food product made from such a starch is especially adversely affected by the addition of phosphates, which is often required in the preparation of cold-swelling starches.

It is further known to subject commercial starch for a short time to a treatment with dilute mineral acids, such as 2 N hydrochloric acid. However, when applying this treatment, care must be taken that the temperature is always kept below the glutinization point because otherwise the starch very rapidly begins to hydrolize and thus lose its ability to swell. Since this method of pre-treating starch does not achieve complete gelatinization, puddings and custards prepared therewith are not shape-retaining or sliceable.

It is an object of the present invention to produce a cold-setting starch which does not exhibit the above-enumerated disadvantages and which, when stirred into cold water, produces a gelled product which is completely equivalent in taste and consistency to an analogous gelled product obtained with boiled starch.

Other objects and advantages of the present invention will become apparent as the description thereof proceeds.

The above objects are achieved in accordance with the present invention by admixing an aqueous suspension of commercial starch, regardless of origin, with one or more organic acids, heating the mixture to a temperature of 90–95° C. while stirring, and thereafter spray-drying the mixture.

More particularly, the process according to the present invention is performed as follows:

A 3–8% suspension of commercial starch in water, whole milk or skim milk is admixed with 0.1–1.5% by weight, preferably 0.4–0.8%, based on the starch, of an organic carboxylic acid, such as citric acid, lactic acid, tartaric acid, acetic acid, fumaric acid, gluconic acid or a mixture of two or more of these. The acidified starch suspension is then heated to about 90–95° C. and is held at this temperature until the starch is completely gelatinized. The gelatinization is in most instances complete after only 5–10 minutes; however, if water is used for preparation of the starch suspension, this temperature may be maintained for several hours without hydrolysis of the starch. After complete gelatinization the starch suspension is subjected to spray-drying. This method of drying is particularly advantageous for the purposes of the present invention because it produces spherical pre-gelatinized starch particles. If whole or skim milk is used to form the initial starch suspension, it is advantageous to work with a low organic acid concentration of about 0.1–0.4% by weight, based on the starch, in order to avoid coagulation of the albumin in the milk.

Pursuant to a preferred embodiment of the present invention, a 5% starch suspension is prepared by stirring commercial starch into the proper amount of water at 40–50° C., the aqueous suspension is admixed with 0.8% by weight (based on the starch) of an organic carboxylic acid, and the mixture is heated to 95° C. and is held at this temperature for ten minutes. Subsequently, the suspension is allowed to cool to about 70° C. and is dried in a spray dryer, the drying air entering the dryer being at a temperature of about 240–280° C.

A food product, such as a pudding or custard, prepared with pre-gelatinized starch obtained pursuant to the present invention is completely equivalent in shape-retaining and slicing as well or organoleptic properties to an analogous food product prepared with boiled starch. In order to achieve increase sliceability and shape-retention, which is desirable for cream and custard fillings used in pastry shops, for instance, the pre-gelatinized starch may be modified with thickeners, such as gelatin, agar, carob bean flour, etc., which are customarily added as stiffeners to puddings, custards or the like prepared with boiled starch. The addition of these thickeners may take place before or after the gelatinization of the starch or also after the treatment of the starch pursuant to the present invention.

The following examples further illustrate the present invention and will enable others skilled in the art to understand it more completely. It should be understood, however, that the invention is not limited to the particular examples given below.

*Example 1*

5.0 kg. of corn starch were introduced into 100 liters of water at 40–50° C. while stirring the water, to form an aqueous starch suspension. 40 gm. of citric acid monohydrate were then added to the suspension. In order to complete the gelatinization, the suspension was heated to a temperature of 90–95° C. and was held at this temperature for about 10–15 minutes. The hot starch paste formed thereby was then introduced into a spray dryer and dried. The drying air entering the spray dryer was at a temperature of 240–280° C. A free-flowing granular starch powder was obtained. When this starch powder was stirred into cold water and the aqueous mixture was allowed to stand at room temperature, it solidified in a short period of time into a shape-retaining, sliceable gelled mass.

*Example 2*

In a manner analogous to that described in Example 1, 5.0 kg. of wheat starch were suspended in a mixture of 50 liters of whole milk and 50 liters of water, 10 gm. of lactic acid were added to the aqueous suspension, and the mixture was gelatinized at 90–95° C. The hot starch paste was then spray-dried as described in Example 1, except that the drying air entering the spray dryer was at 160–180° C. When the free-flowing granular starch powder thus obtained was admixed with water and the mixture was allowed to stand at room temperature, it solidified into a shape-retaining, sliceable gelled mass within a short time.

The cold-setting starch powder obtained in accordance with the present invention may be used for the preparation of pudding or custard mixes which merely need to be stirred into cold water or milk and allowed to stand at room temperature for a short period of time to obtain a finished pudding, custard or the like. In addition to the starch powder according to the present invention, such pudding or custard mixes may contain certified food colors to impart the desired color to the finished pudding or custard, as well as customary flavoring additives, such as fruit flavors, chocolate flavor, coffee flavor, sugar and the like, to impart the desired taste to the gelled food product. Puddings and custards prepared from mixes comprising the starch powder of the present invention do not tend to sweat out water or form a tough film on the surface. When allowed to set in dessert or salad molds, the pudding or custard easily separates from the inverted mold and retains its shape for extended periods of time.

While the present invention has been illustrated with the aid of certain specific embodiments, it will be readily apparent to those skilled in the art that the invention is not limited to these embodiments and that various changes and modifications may be made without departing from the spirit of the invention or the scope of the appended claims.

We claim:
1. The method of preparing pre-gelatinized, cold-setting starch for use in the preparation of shape-retaining puddings, sliceable custards and similar food products, which comprises admixing an aqueous 3 to 8% by weight suspension of commercial starch with at least one edible organic carboxylic acid, heating the resulting mixture to a temperature from 90 to 95° C., inclusive, while stirring, until the starch is completely gelatinized, and thereafter spray-drying said mixture at 160–280° C.

2. The method of preparing pre-gelatinized, cold-setting starch for use in the preparation of shape-retaining puddings, sliceable custards and similar food products, which comprises admixing an aqueous 3 to 8% by weight suspension of commercial starch with at least one edible organic carboxylic acid selected from the group consisting of citric acid, lactic acid, tartaric acid, acetic acid, fumaric acid and gluconic acid, heating the resulting mixture to a temperature from 90 to 95° C., inclusive, while stirring, until the starch is completely gelatinized, and thereafter spray-drying said mixture at 160–280° C.

3. The method of preparing pre-gelatinized, cold-setting starch for use in the preparation of shape-retaining puddings, sliceable custards and similar food products, which comprises admixing an aqueous 3–8% suspension of commercial starch with 0.1 to 1.5% by weight, based on the weight of commercial starch, of at least one edible organic carboxylic acid selected from the group consisting of citric acid, lactic acid, tartaric acid, acetic acid, fumaric acid and gluconic acid, heating the resulting mixture to a temperature from 90 to 95° C., inclusive, while stirring, until the starch is completely gelatinized, and thereafter spray-drying said mixture at 160–280° C′

4. The method of preparing pre-gelatinized, cold-setting starch as in claim 1, which further comprises adding an edible thickener to said starch suspension prior to spray-drying.

5. The method of preparing pre-gelatinized, cold-setting starch as in claim 1, which further comprises adding an edible thickener selected from the group consisting of gelatin, agar and carob bean flour to said starch suspension prior to spray-drying.

References Cited

UNITED STATES PATENTS

| | | | |
|---|---|---|---|
| 2,314,459 | 3/1943 | Salzburg | 99—139 |
| 2,500,179 | 3/1950 | Hinz et al. | 99—139 |
| 2,554,143 | 5/1951 | Hinz et al. | 99—139 |
| 2,613,150 | 10/1952 | Holden | 99—139 |

A. LOUIS MONACELL, *Primary Examiner.*

RAYMOND N. JONES, *Examiner.*

J. M. HUNTER, *Assistant Examiner.*